US005517491A

United States Patent [19]
Nanni et al.

[11] Patent Number: 5,517,491
[45] Date of Patent: May 14, 1996

[54] METHOD AND APPARATUS FOR CONTROLLING FREQUENCY DEVIATION OF A PORTABLE TRANSCEIVER

[75] Inventors: Peter Nanni, Algonquin, Ill.; Kevin Freisen, Lake Worth, Fla.

[73] Assignee: Motorola, Inc., Schaumburg, Ill.

[21] Appl. No.: 433,188

[22] Filed: May 3, 1995

[51] Int. Cl.$^6$ ..................................................... H04B 7/26
[52] U.S. Cl. ...................... 370/29; 340/825.44; 455/56.1
[58] Field of Search .................................. 370/76, 77, 21, 370/24, 26, 32, 71, 79, 84, 95.1, 95.3, 100.1, 104.1, 110.1, 105.4; 340/825.44, 825.47, 825.21, 825.2, 825.39, 825.58; 455/54.1, 56.1, 33.1, 32.2, 33.3, 37.1, 35.1, 42, 51.2; 375/303, 304, 323, 334, 328, 223; 379/59, 57, 97, 98; 324/76.47, 76.55, 76.77; 377/28, 39, 43

[56] References Cited

U.S. PATENT DOCUMENTS 5,124,698   6/1992   Mustonen .......................... 340/825.44
5,361,399  11/1994   Linquist et al. ...................... 455/56.1

*Primary Examiner*—Douglas W. Olms
*Assistant Examiner*—Dang Ton
*Attorney, Agent, or Firm*—R. Louis Breeden

[57] ABSTRACT

A method and apparatus to control frequency deviation of a portable transceiver (PT) (122) utilizing a time-division-duplex (TDD) protocol for communicating with a base transceiver (116). The base transceiver (116) transmits (708) a first signal having first deviation levels (706). The PT (122) receives (802) the first signal, measures (808, 810, 824) it to derive estimates of the first deviation levels, and stores (826) the estimates in a memory (322). The PT (122) generates (828) a second signal having second deviation levels (830) controlled by control signal values (323), samples (832) the second signal to derive a second received signal, and appraises (902) the second received signal to derive estimates of the second deviation levels (830). The PT (122) compares (906) corresponding estimates of the first and second frequency deviation levels (830) to derive adjusted control signal values (908) for controlling the second deviation levels (830) to approximate the first deviation levels (706), and thereafter controls (914) the second deviation levels (830) in accordance with the adjusted control signal values (908).

17 Claims, 8 Drawing Sheets

5,517,491

METHOD AND APPARATUS FOR CONTROLLING FREQUENCY DEVIATION OF A PORTABLE TRANSCEIVER

FIELD OF THE INVENTION

This invention relates in general to selective call communication systems, and more specifically to a method and apparatus for controlling frequency deviation of a portable transceiver.

BACKGROUND OF THE INVENTION

In a selective call communication system modern base stations use accurate frequency deviation modulators for transmission of M-ary frequency shift keyed (FSK) frequency modulated (FM) signals for transmission of outbound messages to portable transceivers. Normally these base stations service very large numbers of subscriber users who are accustomed to low cost subscriber units providing reliable transmission of selective call messages. For this reason, the base stations use accurate timebase systems to generate accurate frequency deviation levels during outbound message transmission to the portable transceivers. The accuracy of the transmitted signals provides a means for accurate message reception by the portable transceivers with relatively inexpensive conventional receiver hardware.

The inbound messages transmitted by the portable transceivers provide an important means for the base stations to determine the reliability of the message transaction. For this reason, accurate inbound transmission is also important. Since the proliferation of portable transceivers is much higher than that for the base stations and since subscriber units are expected to be inexpensive by the common user, it is unfeasible and too costly to consider a transmission architecture design similar to the base stations for the portable transceivers.

Thus, what is needed is a cost effective method and apparatus in the portable transceiver for controlling frequency deviation levels during inbound transmission while maintaining the accuracy needed for the base stations to reliably receive the message.

DESCRIPTION OF THE PREFERRED EMBODIMENT

Figure 1:
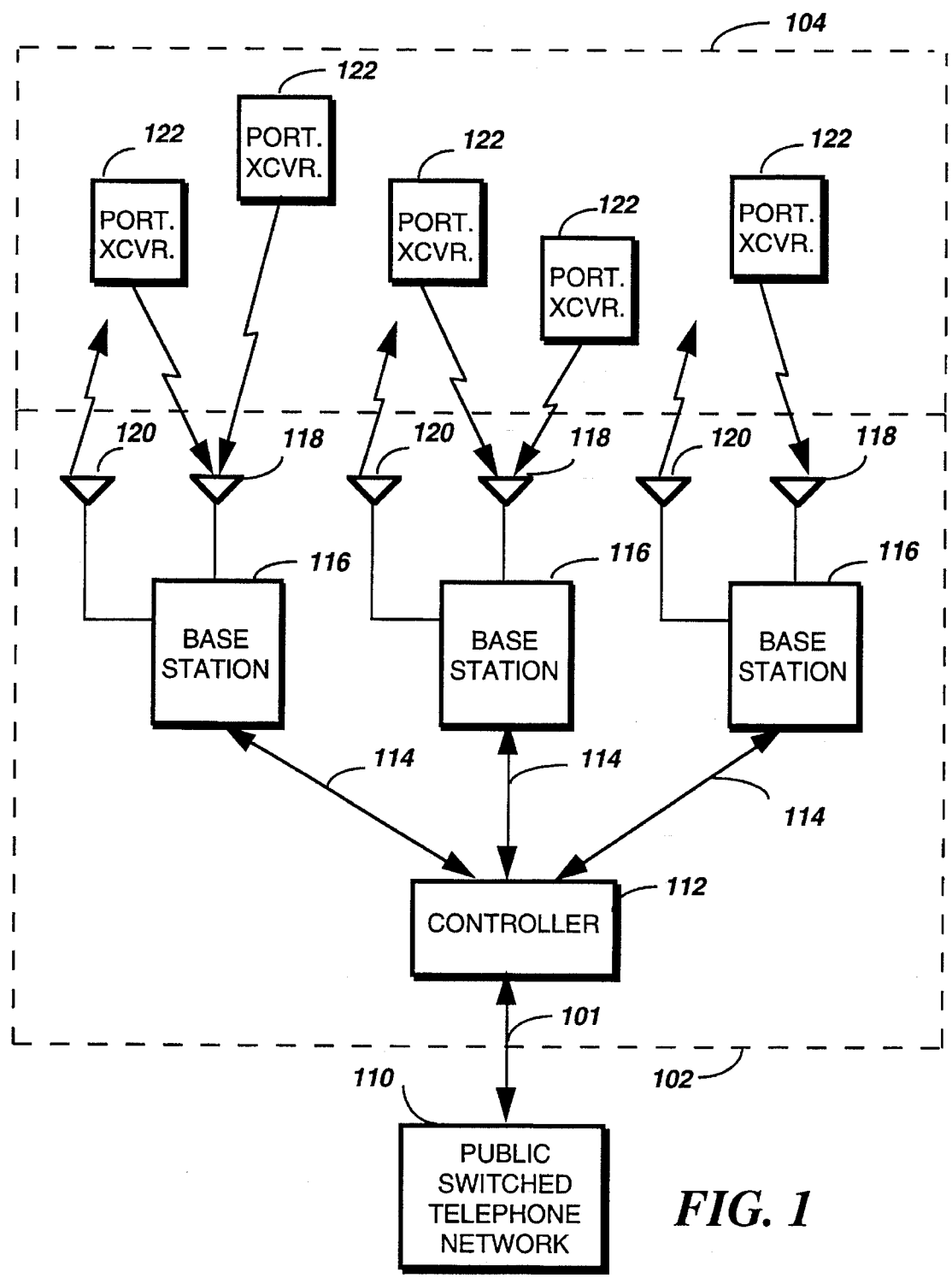
FIG. 1 is an electrical block diagram of a selective call communication system in accordance with the preferred embodiment of the present invention.

Referring to FIG. 1, an electrical block diagram of a selective call communication system in accordance with the preferred embodiment of the present invention comprises a fixed portion 102 and a portable portion 104. The fixed portion 102 comprises a plurality of conventional base transceivers which are base stations 116 coupled by communication links 114 to a controller 112 for controlling the base stations 116. The hardware of the controller 112 is preferably similar to the Wireless Messaging Gateway (WMG™) Administrator! paging control center manufactured by Motorola, Inc. of Schaumburg, Ill. The hardware of the base stations 116 is preferably similar to the Nucleus™ Orchestra! manufactured by Motorola, Inc. of Schaumburg, Ill. Other similar controller hardware can be utilized as well for the controller 112 and base stations 116. The controller 112 comprises a plurality of firmware elements in accordance with the preferred embodiment of the present invention, as will be described further below.

Each of the base stations 116 transmits radio signals to the portable portion 104 comprising a plurality of portable transceivers 122 via a transmitting antenna 120. The base stations 116 each receive radio signals from the plurality of portable transceivers 122 via a receiving antenna 118. The radio signals comprise selective call addresses and messages transmitted to the portable transceivers 122 and acknowledgments received from the portable transceivers 122. It will be appreciated that the portable transceivers 122 can also originate messages other than acknowledgments. The controller 112 preferably is coupled by telephone links 101 to the public switched telephone network (PSTN) 110 for receiving selective call originations therefrom. Selective call originations comprising voice and data messages from the PSTN 110 can be generated, for example, from a conventional telephone coupled to the PSTN 110 in a manner that is well known in the art.

Data and control transmissions between the base stations 116 and the portable transceivers 122 preferably utilize a well-known digital selective call signaling protocol, such as the Motorola REFLEX™ protocol. It will be appreciated that other protocols such as Motorola's new FLEX™ and InFLEXion™ protocols can be utilized as well. These protocols utilize well-known error detection and error correction techniques and are therefore tolerant to bit errors occurring during transmission, provided that the bit errors are not too numerous in any one code word.

Outbound channel transmissions comprising data and control signals from the base stations 116 preferably utilize four-level frequency shift keyed (FSK) modulation, operating at sixteen-hundred or thirty-two-hundred symbols-per-second (sps), depending on traffic requirements and system transmission gain. Inbound channel transmissions from the portable transceivers 122 to the base stations 116 preferably utilize binary FSK modulation at a rate of ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency.

U.S. Pat. No. 4,875,038 to Siwiak et al., which describes a prior art acknowledge-back selective call communication system, is hereby incorporated herein by reference. For further information on the operation and structure of an acknowledge-back selective call communication system, please refer to the Siwiak et al. patent.

Figure 2:
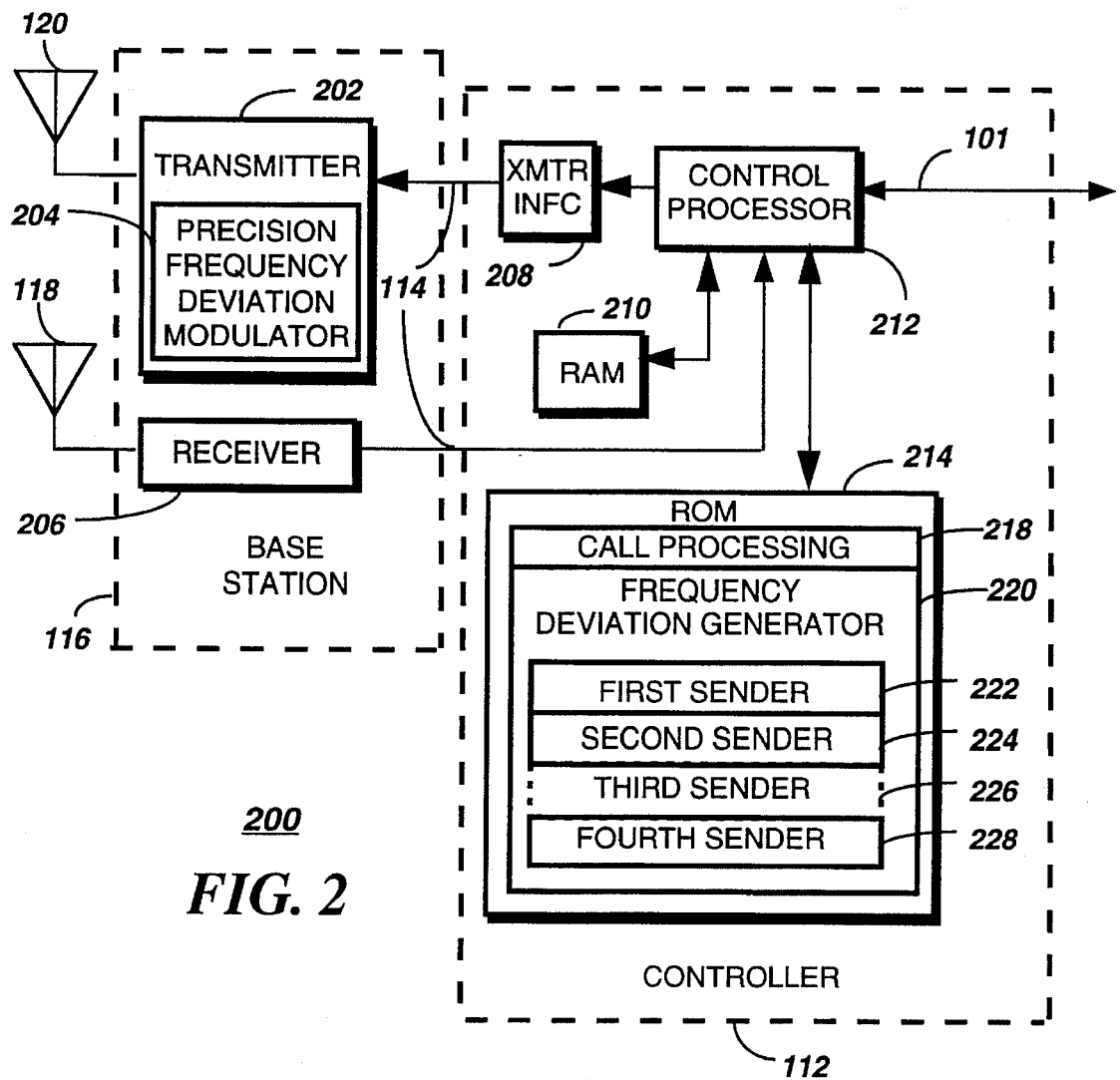
FIG. 2 is an electrical block diagram of elements of a fixed portion of the selective call communication system in accordance with the preferred embodiment of the present invention.

Referring to FIG. 2, an electrical block diagram of elements 200 of the fixed portion 102 in accordance with the preferred embodiment of the present invention comprises portions of the controller 112 and the base stations 116. The controller 112 comprises a control processor 212 for directing operation of the controller 112. The control processor 212 preferably is coupled through a transmitter interface 208 to a transmitter 202, both utilizing conventional techniques well known in the art. The transmitter 202 preferably transmits four-level FSK data messages to one of the portable transceivers 122. The control processor 212 is also coupled to at least one acknowledgment receiver 206 using conventional binary FSK demodulation. The acknowledgment receiver 206 can be collocated with the base stations 116, as implied in FIG. 2, but preferably is positioned remote from the base stations 116 to avoid interference from the transmitter 202. The acknowledgment receiver 206 is for receiving one or more acknowledgments from the plurality portable transceivers 122.

The control processor 212 is coupled to a random access memory (RAM) 210 for storing messages to be transmitted to the portable transceivers 122, and for storing messages received from the portable transceivers 122. The control processor 212 also is coupled to a read-only memory (ROM) 214 comprising firmware elements for use by the control processor 212. It will be appreciated that other types of memory, e.g., electrically erasable programmable ROM (EEPROM) or magnetic disk memory, can be utilized as well for the ROM 214 or RAM 210. It will be further appreciated that the RAM 210 and the ROM 214, singly or in combination, can be integrated as a contiguous portion of the control processor 212. Preferably, the control processor 212 is similar to the DSP56100 digital signal processor (DSP) manufactured by Motorola, Inc. of Schaumburg, Ill. It will be appreciated that other similar processors can be utilized as well for the control processor 212, and that additional processors of the same or alternate type can be added as required to handle the processing requirements of the controller 112.

The firmware elements comprise a call processing element 218 for handling the processing of an incoming call for a called party and for controlling the transmitter 202 to send a message identifying the call source to the portable transceiver 122 corresponding to the called party, utilizing techniques well known in the art. The firmware elements further comprise a frequency deviation generator 220 further comprising a first sender element 222, a second sender element 224, a third sender element 226 and a fourth sender element 228, in accordance with the preferred embodiment of the present invention. The first sender element 222 is used by the control processor 212 as a means for sending a predetermined signal to the base stations 116 via the communication links 114 having a predetermined plurality of frequency deviation levels. The predetermined signal is used by the precision frequency deviation modulator 204 for transmitting a signal to the portable transceivers 122.

The second sender element 224 is used by the control processor 212 as a means for transmitting from the base stations 116 a predetermined signal having N predetermined frequency deviation levels, N being a predetermined integer, and wherein the second modulated signal transmitted by the portable transceiver 122, as will be described further below, has M frequency deviation levels, M being a predetermined integer greater than N. For example, for N equal to two and M equal to four, the base stations 116 transmit two level FSK and the portable transceiver 122 transmits a second modulated signal using four level FSK.

In an alternative embodiment of the present invention, the third sender element 226 is used by the control processor 212 as a means for transmitting from the base stations 116 a predetermined signal having N predetermined frequency deviation levels, M of which correspond to the M frequency deviation levels of the second modulated signal transmitted by the portable transceiver 122, N being a predetermined integer equal to or greater than M. For example, for N equal to four and M equal to two, the base stations 116 transmit four level FSK and the portable transceiver 122 transmits a second modulated signal using two level FSK. Similarly, for N equal to four and M equal to four, the base stations 116 and the portable transceiver 122 transmit the same number of frequency deviation levels, that is, both transmit four level FSK. The significance of the second sender element 224 and third sender element 226 will become evident in the discussion of the firmware elements of the portable transceiver 122, and in particular a discussion of the comparator element 524 of FIG. 5, as will be described further below.

The fourth sender element 228 is used by the control processor 212 as a means for transmitting from the base stations 116 a predetermined signal having N predetermined frequency deviation levels, N being a predetermined integer, and wherein ones of the N predetermined frequency deviation levels are transmitted a plurality of times in the predetermined signal. In processing a received message from the PSTN 110 the fixed portion 102 of the selective call communication system generates a signaling format enabling communication with the portable transceiver 122. In the message signaling format an outbound preamble 406 (FIG. 4) is transmitted by the base stations 116. The outbound preamble 406 is used by the portable transceiver 122 for both signal synchronization, and for deriving frequency deviation level references to be later used during inbound transmission. The frequency deviation references are used as a means for determining the accuracy of the second modulation signal transmitted by the portable transceiver 122, as will be described further below.

Figure 3:
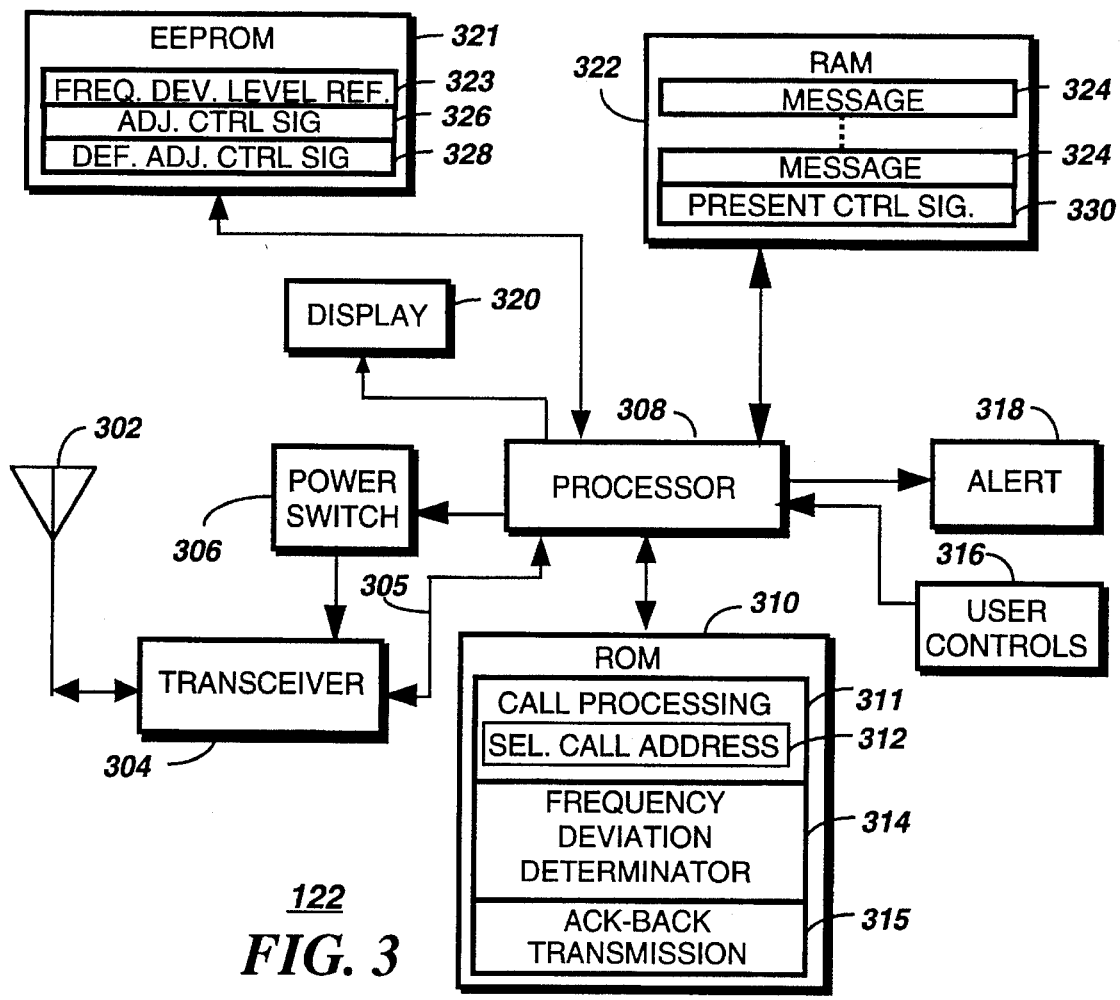
FIG. 3 is an electrical block diagram of a portable transceiver in accordance with the preferred embodiment of the present invention.

Referring to FIG. 3, an electrical block diagram of the portable transceiver 122 in accordance with the preferred embodiment of the present invention comprises a transceiver antenna 302 for transmitting and intercepting radio signals to and from the base stations 116, respectively. The radio signals linked to the transceiver antenna 302 are coupled to a transceiver 304. The radio signals received from the base stations 116 use conventional two and four-level FSK. Similarly, radio signals transmitted by the transceiver 304 to the base stations 116 also use two and four-level FSK. It will be appreciated by one of ordinary skill in the art that the transceiver antenna 302 is not limited to a single antenna for transmitting and receiving radio signals. Separate antennas for receiving and transmitting radio signals would also be suitable. The radio signals just discussed are preferably selective call (paging) signals which use REFLEX™ signaling formats. It will be appreciated that other signaling formats can also be used.

Radio signals received by the transceiver 304 produce demodulated information at the output. The demodulated information is transferred over a signal information bus 305 which is coupled to the input of a processor 308, which processes the information in a manner well known in the art. Similarly, acknowledge response messages are processed by the processor 308 and delivered through the signal information bus 305 to the transceiver 304. The acknowledge response messages transmitted by the transceiver 304 are preferably modulated using two and four-level FSK operating at a bit rate of ninety-six-hundred bps. It will be appreciated that other bit rates can be used as well.

A conventional power switch 306, coupled to the processor 308, is used to control the supply of power to the transceiver 304, thereby providing a battery saving function. The processor 308 is coupled to a random access memory (RAM) 322 for storing messages in a message storage location 324 and a present control signals element 330 for processing of the second modulated signal. The processor 308 is also coupled to an electrically erasable programmable read only memory (EEPROM) 321 which comprises a frequency deviation level references element 323, an adjustment control signal values element 326 and a default adjustment control signal values element 328. The EEPROM 321 serves as a non-volatile memory device for storing the reference elements used for processing the second modulation signal, as will be described below. The processor 308 also is coupled to a read-only memory (ROM) 310 comprising firmware elements for use by the processor 308. It will be appreciated that other types of memory, e.g., electrically erasable programmable ROM (EEPROM), can be utilized as well for the ROM 310 or RAM 322.

The firmware elements comprise a call processing element 311 further comprising a selective call address 312 for handling of incoming messages on the outbound channel using techniques well known in the art. When an address is received by the processor 308, the call processing element 311 compares one or more selective call addresses 312 stored in ROM 310, and when a match is detected, a call alerting signal is generated to alert a user that a message has been received. The call alerting signal is directed to a conventional audible or tactile alerting device 318 for generating an audible or tactile call alerting signal. In addition, the call processing element 311 processes the message which is received in a digitized conventional manner and then stores the message in the message storage location 324 in RAM 322. The message can be accessed by the user through user controls 316, which provide functions such as lock, unlock, delete, read, etc. More specifically, by the use of appropriate functions provided by the user controls 316, the message is recovered from the RAM 322, and then displayed on a display 320, e.g., a conventional liquid crystal display (LCD).

The firmware elements further comprise a frequency deviation determinator element 314 used by the processor 308 during acknowledge response messaging for determining the frequency deviation levels to be used for accurate transmission to the base stations 116, in accordance with the preferred embodiment of the present invention. Once the frequency deviation levels have been determined by the frequency deviation determinator element 314, the processor 308 invokes an acknowledge-back transmission element 315 which controls transmission of the acknowledge response message to the base stations 116.

Figure 4:
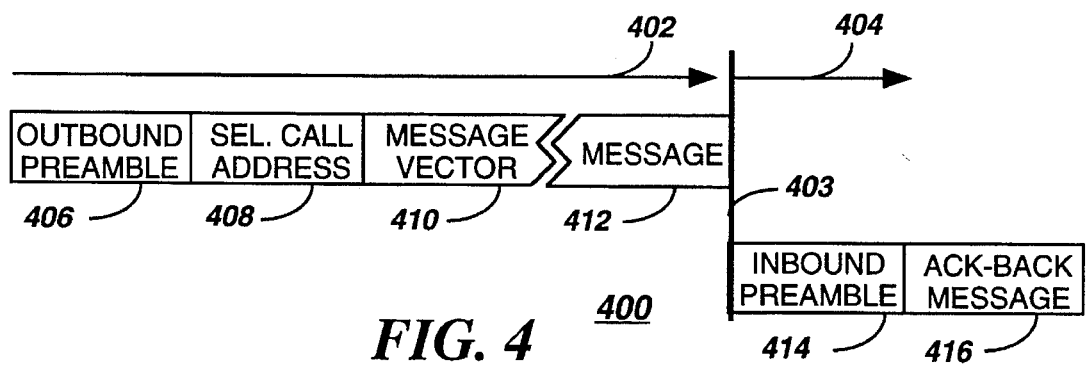
FIG. 4 is a timing diagram of elements of an outbound protocol and an inbound protocol of the fixed and portable portions of the selective call communication system in accordance with the preferred embodiment of the present invention.

Referring to FIG. 4, a timing diagram depicts elements of an outbound protocol and an inbound protocol of the fixed portion 102 and portable portion 104 of the selective call communication system in accordance with the preferred embodiment of the present invention. The signaling format operating on the outbound and inbound channels preferably operates on a single carrier frequency utilizing well-known time division duplex (TDD) techniques for sharing the frequency. Using TDD transmission the outbound RF channel transmission is depicted as an outbound transmission time interval 402, while the inbound RF channel transmission is depicted as an inbound transmission time interval 404. The outbound transmission time interval 402 and the inbound transmission time interval 404 are subdivided by a time boundary 403. The time boundary 403 depicts a point in time when the outbound transmissions cease and the inbound transmissions commence.

The elements of the outbound protocol comprise an outbound preamble 406, a selective call address 408, a message vector 410 and a message 412, while the inbound protocol comprises an inbound preamble 414 and an acknowledge-back message 416. The outbound preamble 406 would preferably consists of a recognizable pattern such as an alternating binary one's and zero's pattern. It will be appreciated, however, that other patterns which exercise all four frequency deviation levels can be utilized for the preamble. The outbound preamble 406 is used by the portable transceiver 122 for measuring frequency deviation levels received on the outbound channel. The selective call address 408 identifies the portable transceiver 122 which the message 412 is intended. The message vector 410 points in time within the TDD signal format to the position of the message 412 to be received by the portable transceiver 122. Similarly, the inbound preamble 414 preferably consists of a recognizable pattern such as an alternating binary one's and zero's pattern. It will also be appreciated that other patterns which exercise all four frequency deviation levels can be utilized. The inbound preamble 414 transmitted on the inbound channel forms the second modulated signal which the portable transceiver 122 uses, in conjunction with either the adjustment control signal values element 326 or the default adjustment control signal values element 328, for adjustment of the transmission signal to match the transmission reference of the base stations 116, as will be discussed below.

Figure 5:
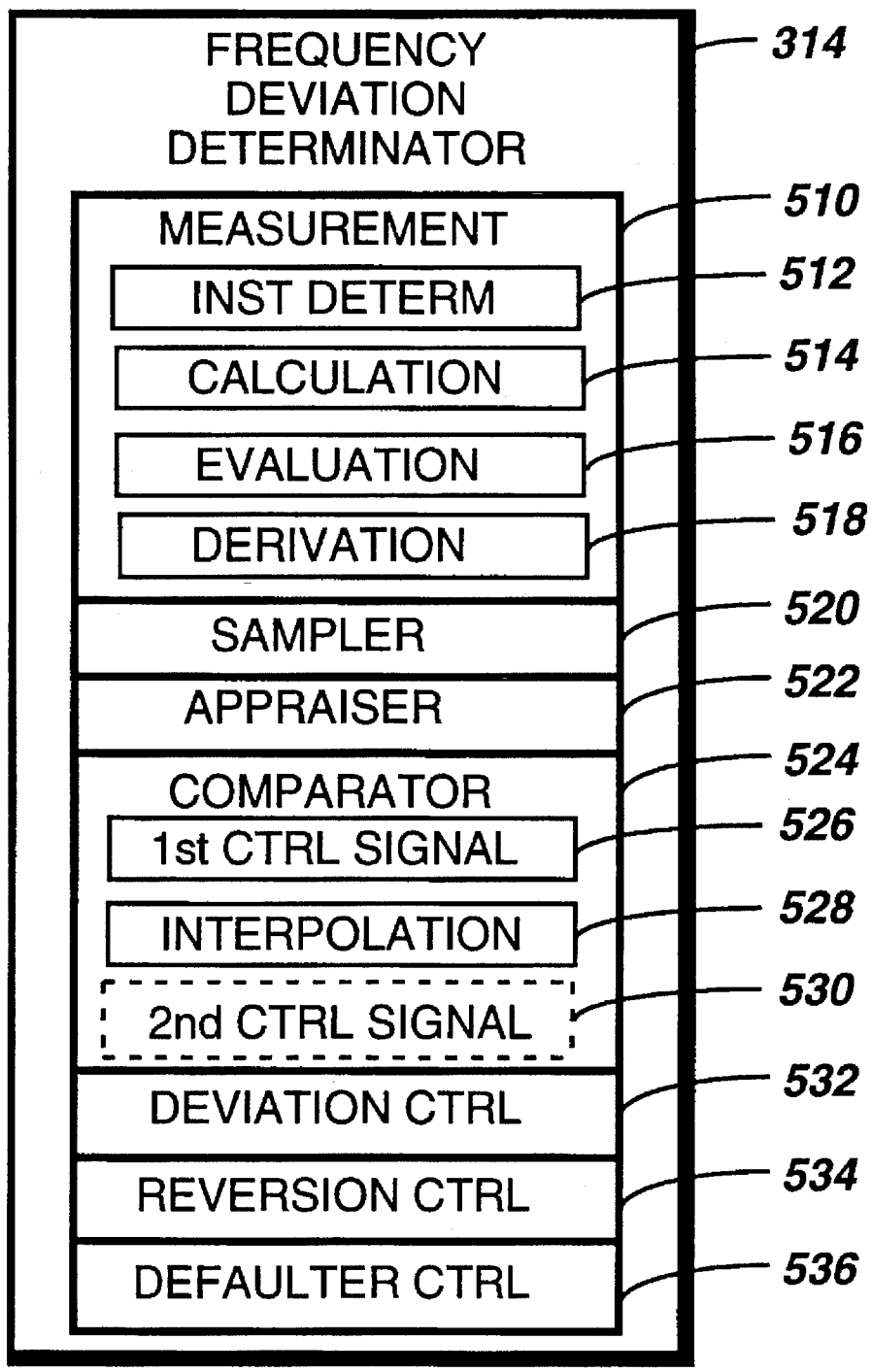
FIG. 5 is a firmware block diagram of elements of the portable transceiver in accordance with the preferred embodiment of the present invention.

Referring to FIG. 5, a block diagram depicting the firmware elements of the frequency deviation determinator element 314 of the portable transceiver 122 in accordance with the preferred embodiment of the present invention comprises a measurement element 510, a sampler element 520, an appraiser element 522, a comparator element 524, a deviation control element 532, a reversion control element 534 and a defaulter control element 536. As shown, the measurement element 510 comprises an instantaneous determination element 512, a calculation element 514, an evaluation element 516 and a derivation element 518. In addition, the comparator element 524 comprises a first control signal element 526, an interpolation element 528 and a second control signal element 530. The second control signal element 530 is an alternative embodiment in accordance with the present invention and is highlighted with dashed lines for this reason.

When the base stations 116 transmit the outbound preamble 406, for example, in two and four level FSK to the portable transceiver 122, the transceiver 304 demodulates the received signal to baseband and provides the demodulated information in a binary digitized format to the processor 308. Each binary sample represents symbol levels from a predetermined symbol alphabet. The measurement element 510 derives frequency deviation level references from the outbound preamble 406. The alternating pattern incorporated in the outbound preamble 406 preferably exercises two predetermined frequency deviation levels, which the instantaneous determination element 512 uses for measuring two pluralities of instantaneous deviation levels. The calculation element 514 then calculates two mean values corresponding to the two pluralities of instantaneous deviation levels. The evaluation element 516 determines the signal integrity of the outbound message by evaluating the first received signal to produce an error count of errors received in the first received signal. A quality test is performed by the evaluation element 516 to determine if the error count has exceeded a predetermined error threshold such as, for example, one uncorrectable bit error. It will be appreciated that other methods may be utilized, such as correlation between the received preamble and the known bit pattern of the preamble. The error detection and correction mechanism is preferably implemented with a coding scheme such as Bose, Chaudhuri, Hocquernghem (BCH), as is well known by one of ordinary skill in the art. It will be appreciated that other error detection and correction codes can be used. If the quality test is passed, the derivation element 518 derives estimates of the frequency deviation levels of the outbound preamble 406. The estimates determined by the derivation element 518 preferably are the two mean values generated by the calculation element 514. It will be appreciated that other forms of estimates can be used, for example, a single instantaneous sampling of the two predetermined frequency deviation levels. After the measured frequency deviation levels have been processed, the measurement element 510 stores the results in the frequency deviation level references element 323 in the EEPROM 321.

Before the acknowledge-back transmission element 315 is invoked, the frequency deviation determinator 314 begins inbound channel processing and adjusts the inbound transmission circuits for acknowledge-back messaging. During inbound transmission the frequency deviation determinator 314 begins transmitting a second modulated signal comprising the inbound preamble 414. The signal transmitted has enough power density to be RF coupled into the receiver circuits. The receiver circuits demodulate the signal in the same manner as with outbound messages. The demodulated information, as before, is in a binary digitized format delivered to the processor 308. The binary digitized format is used by the sampler element 520 to create a second receive signal for comparison to the frequency deviation level references 323 pre-stored in EEPROM 321. The appraiser element 522 appraises the second received signal to derive estimates of the second plurality of frequency deviation levels.

The comparator element 524 compares corresponding estimates of the first and second pluralities of frequency deviation levels to derive a plurality of adjusted control signal values for controlling the second plurality of frequency deviation levels. In a preferred embodiment of the present invention, the comparator element 524 uses a first control signal element 526 for derivation of the four frequency deviation levels needed for inbound channel transmission. In this embodiment, the second modulated signal transmitted by portable transceiver 122 preferably has four frequency deviation levels which exceed the two frequency deviation levels transmitted by the base stations 116. The first control signal element 526 compares two of the frequency deviation level references element 323 stored in EEPROM 321 with two corresponding frequency deviation levels of the second modulated signal to derive two adjusted control signal values for controlling the two corresponding frequency deviation levels of the second modulated signal. Since the portable transceiver 122 needs four frequency deviation levels for transmission to the base stations 116, a mechanism is needed to derive the two remaining frequency deviation levels for acknowledge-back transmission. The interpolation element 528 interpolates between the two adjusted control signal values to obtain two additional adjusted control signal values corresponding to the two additional frequency deviation levels of the second modulated signal. Once the two additional frequency deviation levels have been determined, all four frequency deviation levels have been derived and acknowledge-back transmission deviations can be adjusted accordingly. It will be appreciated that other symbol alphabets can be utilized, for example, eight level, sixteen level FSK, etc.

In an alternative embodiment of the present invention, the comparator element 524 uses a second control signal element 530 for derivation of M frequency deviation levels needed for inbound channel transmission. In this embodiment, the N frequency deviation levels transmitted by the base stations 116 exceed or equal the M frequency deviation levels transmitted by portable transceiver 122. In this case, the second control signal element 530 is compared to M of the frequency deviation levels stored in the frequency deviation level references element 323 with M frequency deviation levels of the second modulated signal to derive M adjusted control signal values.

TABLE 1

| First received signal digitized frequency deviation level references | Second received signal digitized frequency deviation levels | Error between first received signal references and second modulated signal digitized samples | Present second modulation signal adjusted control values | New adjusted control values based on calculated error which will replace the present second modulation signal adjusted control values |
|---|---|---|---|---|
| Vh | Vw | $Eh = Vh - Vw$ | Va | $Vanew = Va + (Eh * Kp)$ |
| Vmh | Vx | $Emh = Vmh - Vx$ | Vb | $Vbnew = Vb + (Emh * Kp)$ |
| Vml | Vy | $Eml = Vml - Vy$ | Vc | $Vcnew = Vc + (Eml * Kp)$ |
| Vl | Vz | $El = Vl - Vz$ | Vd | $Vdnew = Vd + (El * Kp)$ |

TABLE 1, shown above, summarizes the preferred calculation process for the comparator element 524 described above. As discussed above, in the preferred embodiment in accordance with the present invention, the portable transceiver 122 receives two frequency deviation levels from the base stations 116 preferably using two level FSK. The receiver hardware, to be described below, demodulates the outbound signal to baseband and generates binary digitized samples in the form of a voltage level symbol alphabet. The plurality of digitized samples constitutes two frequency deviation levels of the first received signal. The measurement element 510 processes and stores estimates of the digitized samples in the frequency deviation level references element 323 in the EEPROM 321. The estimates stored in the frequency deviation level references element 323 closely match the frequency deviation levels transmitted by the base stations 116. For two level FSK, TABLE 1 represents the two level estimates stored in the frequency deviation level references element 323 by the values Vh (voltage high) and Vl (voltage low) shown in the first column of the table. The values Vmh (voltage medium high) and Vml (voltage medium low) are used when the outbound signal is transmitted with four level FSK, which applies to the alternative embodiment of the present invention, to be discussed below.

During inbound transmission the inbound preamble 414 is transmitted in a second modulation signal which RF couples to the receiver circuits and is demodulated in the same format the outbound signal was demodulated. Since Vh and Vl are the only frequency deviation references available from the base stations 116, the frequency deviation determinator 314 generates the second modulated signal with an attempt to match Vh and Vl. At start-up the default values stored in the adjusted control signal values element 328 are utilized. The binary digitized samples generated by the receiver circuits are used by the sampler element 520 to create a second receive signal for comparison to the frequency deviation level references element 323 represented by Vh and Vl. The appraiser element 522 appraises the second received signal to derive digitized estimates of the frequency deviation levels of the second received signal. TABLE 1 represents the two digitized frequency deviation levels generated by the appraiser element 522 as the values Vw and Vz. The values Vx and Vy are used when the second modulated signal is transmitted with four frequency deviation levels. The comparator element 524 calculates the difference between Vh and Vw, and Vl and Vz to determine the digital error present in the second received signal. TABLE 1 shows the error between Vh and Vw by the equation Eh and the error between Vl and Vz by the equation El. The fourth column of TABLE 1 shows the present adjusted control values which are stored in the present control signal element 330 in RAM 322 used by the frequency deviation determinator 314 to control the second modulated signal. The values Va and Vd are the present estimates used for controlling the second modulated signal, which generate Vw and Vz, respectively in an attempt to match Vh and Vl, respectively.

The fifth column of TABLE 1 shows the new adjusted control values based on the calculated error, which will replace the present second modulation signal adjusted control values in the fourth column. These new values are determined by multiplying the digital error (Eh or El) with the gain Kp of the processor 308. The circuit loop used for adjusting the second modulation signal includes a transmitter block, a receiver block, both to be described in detail below, and the processor 308. Kp represents the loop gain of the processor 308 used for adjusting the control values of the second modulation signal. The transmitter block has a gain factor to be denoted by Kt and the receiver block also has a gain factor to be denoted by Kr. The transmitter block converts volts to frequency based on the input voltage provided (i.e., Va through Vd and corresponding to Fa through Fd), while the receiver block converts frequency to voltage based on the input frequency provided (i.e., Fa through Fd and corresponding to Vx through Vz). The overall system gain is Ks which equates to the product of Kp, Kt and Kr. In order for the system to remain stable, Ks must be less than unity and is preferably in the range of 0.2 to 0.5. Kt and Kr are preferably constant values and are determined from design of the conventional transmitter and receiver blocks. Kp is chosen appropriately to maintain the system gain Ks less than unity and preferably in the range of 0.2 to 0.5.

To calculate the value of Vanew which correspondingly updates Va, the digital error Eh is multiplied by Kp. This factor gives the number of increments (positive or negative) needed for adjusting the present adjustment value Va. Once Vanew is calculated it serves as the new adjustment level used by the frequency deviation determinator 314 for transmitting the second modulated signal controlled by Va. The value Vdnew which is adjusted to match Vl is calculated in the same manner. The adjustment process for Vanew and Vdnew ceases when the incremental adjustments oscillate between plus or minus one bit change from the present values of Va and Vd, respectively. It will be appreciated that other comparison methods for the determination of the second modulated signal adjustment values Va and Vd can be utilized.

Once Va and Vd adjusted have been calculated, the values Vb and Vc must be calculated by the interpolation element 528. The relationship of voltage to frequency is preferably linear; thus by knowing Va relative to a frequency Fa and Vd relative to a frequency Fd the slope of the frequency versus voltage line can be determined. The slope m thus equals to (Fd–Fa)/(Vd–Va), i.e., the ratio of the difference between Fd and Fa to the difference between Vd and Va. By knowing the slope m the values Vb at a desired frequency Fb and Vc at a desired frequency Fc can be determined. For example, with the equation m equals (Fa–Fb)/(Va–Vb), Vb can be solved for easily since Vb is the only unknown variable. Similarly, Vc can be solved from m equals (Fd–Fc)/(Vd–Vc). It will be appreciated by one of ordinary skill in the art that other more sophisticated methods can be utilized. For example, when the transceiver circuit behavior indicates a non-linear frequency to voltage relationship, a characterization curve can be programmed into each portable transceiver 122 during manufacturing. The pre-programmed characterization curve may be used during the interpolation process to determine values such as Vb and Vc.

In an alternative embodiment in accordance with the present invention the outbound signal has equal or greater frequency deviation levels to the second modulated signal sent during inbound transmission. In this case, the interpolation element 528 is not necessary. Instead all levels used in the second modulation signal are determined directly in the same manner as Va and Vd, as described above.

Once all inbound transmission adjustment control values have been determined (e.g., Va, Vb, Vc and Vd) these values are stored in the adjustment control signal values element 326. The deviation control element 532 uses the values in the adjustment control signal values element 326 to control the transmitter hardware, to be described below, which transmits the acknowledge-back message in four level FSK tuned to the frequency deviation levels of the base stations 116.

When the evaluation element 516 determines the outbound received signal integrity does not meet the necessary quality thresholds, the comparator element 524 is bypassed. Thus, the calculations described above are bypassed, and the reversion control element 534 is invoked by the processor 308. Since the comparator element 524 is bypassed the reversion control element 534 reverts to the adjustment control signal values element 326 stored in the EEPROM 321 processed from a previous adjustment control process during inbound channel transmission. If, however, the reversion control element 534 determines that the adjustment control signal values element 326 does not contain pre-stored adjusted control signal values, the defaulter control element 536 is invoked. The defaulter control element 536 reverts to the default adjustment control signal values element 328 pre-stored in EEPROM 321. The values in the default adjustment control signal values element 328 are preferably determined during the manufacturing process of the portable transceiver 122, and in particular during RF tuning of the transceiver 304 hardware. It will be appreciated that the values in the default adjustment control signal values element 328 can, alternatively, be derived by periodic sampling of outbound adjustment frames transmitted by the base stations 116 or by other related methods.

Figure 6:
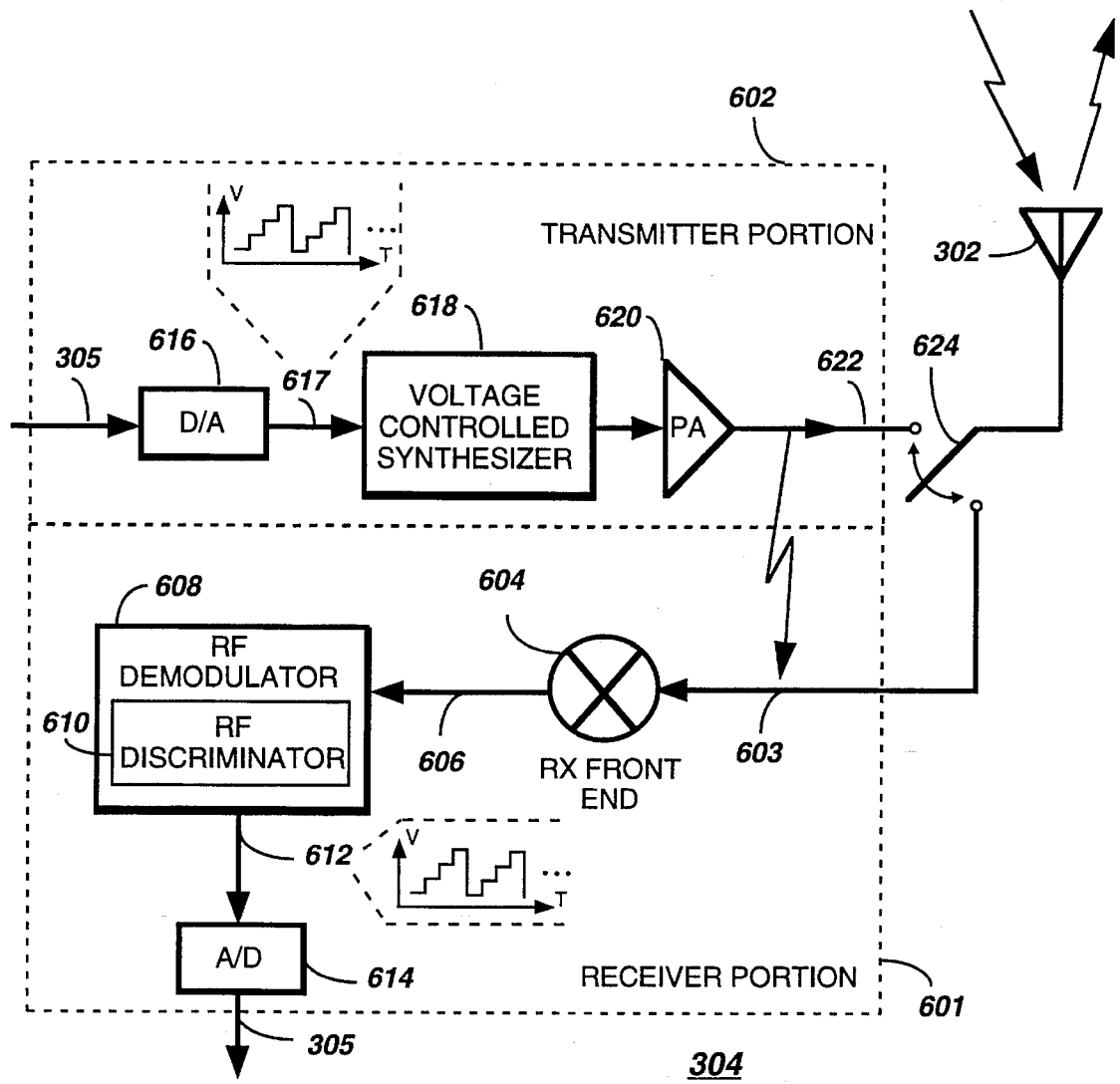
FIG. 6 is an electrical block diagram of portions of a transceiver element of the portable transceiver in accordance with the preferred embodiment of the present invention.

Referring to FIG. 6, an electrical block diagram of the hardware of the transceiver 304 in accordance with the preferred embodiment of the present invention comprises a receiver portion 601 and a transmitter portion 602. The transceiver antenna 302 is coupled to an RF switch 624 which switches between the receiver portion 601 and the transmitter portion 602. When outbound messages are received, the RF switch is switched to the receiver portion 601 and when inbound messages are to be transmitted, the RF switch 624 is switched to the transmitter portion 602. Outbound messages received by the transceiver antenna 302 are transferred over an RF signal bus 603 coupled to the input of a conventional receiver front end mixer 604 utilizing techniques well known in the art. The output of the conventional receiver front end mixer 604 is coupled to an intermediate frequency (IF) signal bus 606. The IF signal bus 606 is coupled to the input of a conventional RF demodulator 608 which demodulates the IF signal utilizing techniques well known in the art. The conventional RF demodulator 608 comprises an RF discriminator 610 utilizing conventional techniques well known in the art, which converts baseband frequency signals to voltage symbol levels, as is well known by one of ordinary skill in the art. The voltage symbol levels are transferred through a baseband signal bus 612 (depicted with symbol wave forms by way of example) to the input of an analog to digital converter (A/D) 614 of conventional design well known in the art. The A/D 614 samples the voltage level symbol alphabet on the baseband signal bus 612, generating a binary digital representation of the symbol levels. The accuracy of the digitized samples depends on the resolution (e.g., 8 bit A/D) of the A/D as is well known in the art. The output of the A/D 614 is coupled to the signal information bus 305 which transfers the digitized samples to the processor 308. Once the digitized samples have been received by the processor 308 the frequency deviation determinator element 314 performs the necessary processing to determine frequency deviation level references as was described above.

The transmitter portion 602 receives its input from the processor 308 through the signal information bus 305. The processor 308 relays binary digitized samples to the digital to analog converter (D/A) 616, which converts the digitized samples into a voltage level symbol alphabet. The voltage level symbol alphabet is transferred on a baseband transmitter signal bus 617 (depicted with symbol wave forms by way of example) to a voltage controlled synthesizer 618 utilizing conventional techniques well known in the art, which modulates the voltage level symbol alphabet to an M-ary FSK signal, utilizing techniques well known in the art. The FSK signal generated by the voltage controlled synthesizer 618 is then amplified by a power amplifier 620 utilizing conventional techniques well known in the art, coupled to the transceiver antenna 302, which reliably transmits an inbound message for the base stations 116. The RF signal power generated by the power amplifier 620 is sufficient to couple enough RF energy between the transmitter portion 602 and the receiver portion 601. It will be appreciated that the RF coupling can easily be accomplished by way of a trace on the printed circuit board of the receiver portion 601. It will also be appreciated that, alternatively, if the transceiver antenna 302 were composed of separate transmitter and receiver antennas, the receiver antenna could remain connected at all times whereby the RF signal transmitted by the transmitter portion 602 would couple into the receiver antenna. By RF coupling from the transmitter portion 602 to the receiver portion 601 the second modulated signal can be sampled and processed by the frequency deviation determinator 314, which will generate therefrom the necessary frequency deviation level adjustments for transmitting an accurately deviated inbound channel signal.

Figure 7:
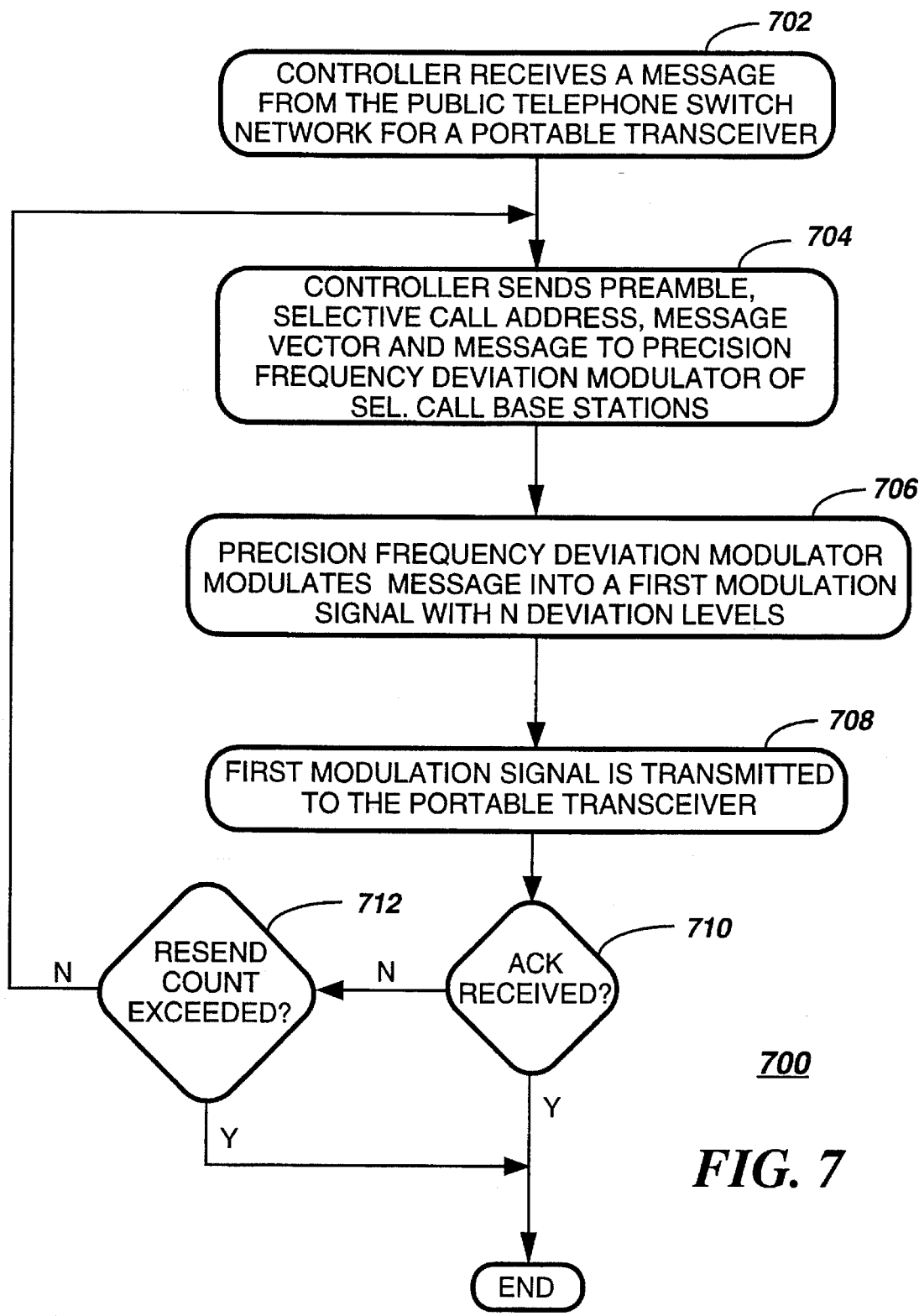
FIG. 7 is a flow chart depicting operation of the fixed portion of the selective call communication system in accordance with the preferred embodiment of the present invention.

Referring to FIG. 7, a flow chart 700 summarizing the operation of the fixed portion 102 of the selective call communication system in accordance with the preferred embodiment of the present invention begins with step 702 where the controller 112 receives a selective call message from the PSTN 110. In step 704 the controller 112 sends an outbound signaling format as described in FIG. 4 to the precision frequency deviation modulator 204 of the base stations 116. In step 706 the precision frequency deviation modulator 204 which modulates the outbound message into a first modulation signal with N deviation levels. In step 708 the first modulated signal is then transmitted to the portable transceiver 122. In step 710 the base stations check for an acknowledgment response from the portable transceiver 122. If an acknowledgment response is received then the base stations 116 have completed the message transmission task. If, however, no acknowledgment is received from the portable transceiver 122 then in step 712 a resend count is checked. If the resend count is not exceeded re-transmission of the selective call message is restarted. If, however, the resend count is exceeded the message transmission task is terminated.

Figure 8:
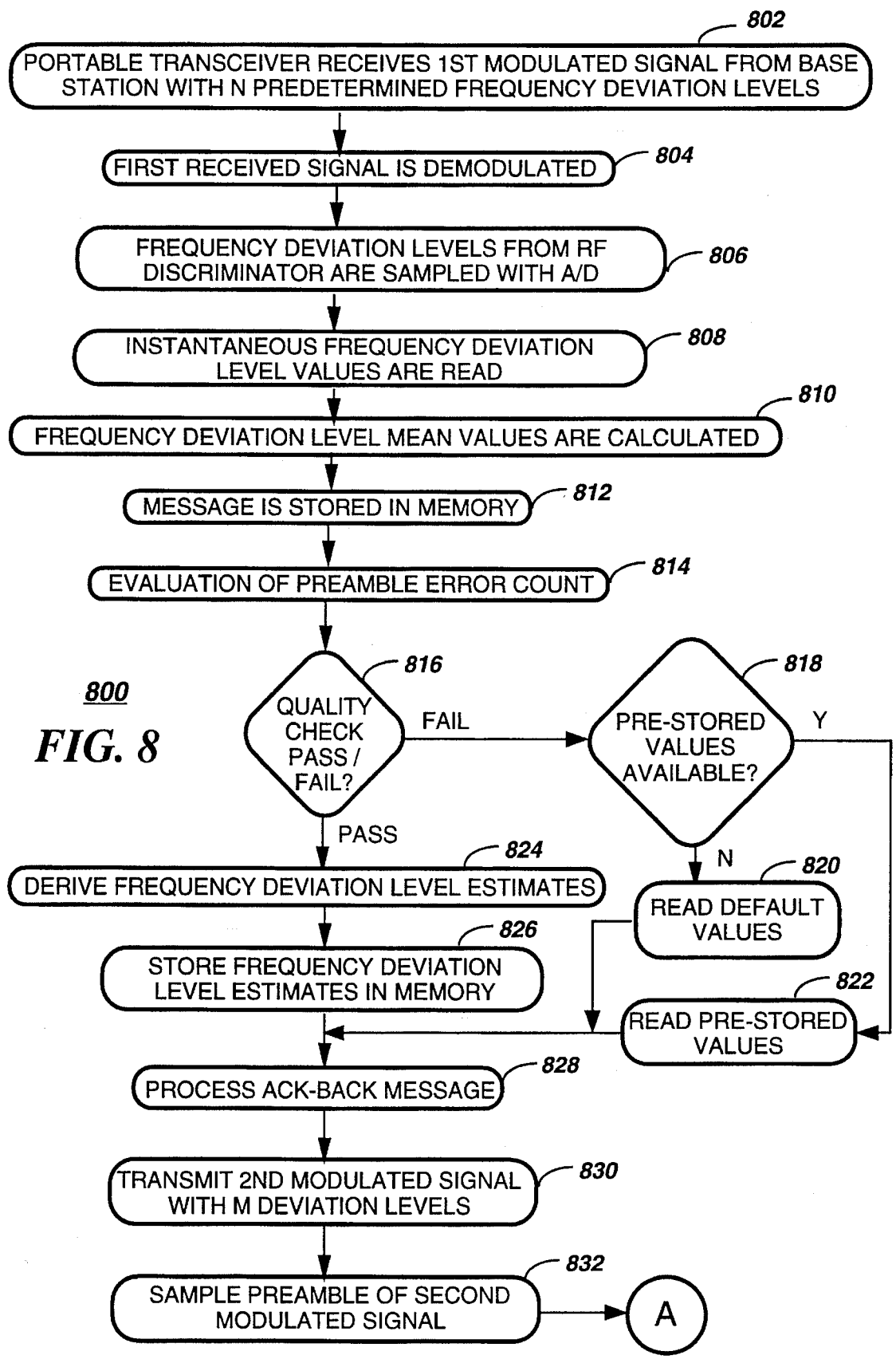
FIG. 8 is a flow chart depicting operation of the portable transceiver in accordance with the preferred embodiment of the present invention.

Referring to FIG. 8, a flow chart 800 summarizing the operation of the portable transceiver in accordance with the preferred embodiment of the present invention begins with step 802 where the portable transceiver 122 receives the first modulated signal with N predetermined frequency deviation levels sent by the base stations 116. In step 804 the first received signal is demodulated by the receiver portion 601. In step 806 the RF discriminator 610 generates N frequency deviation levels which are sampled by the A/D 614. In step 808 the instantaneous digitized samples from the A/D 614 are read by the processor 308. In step 810 mean values are calculated for the digitized N frequency deviation levels. In step 812 the decoded message is stored in the message storage location 324 in RAM 322. In step 814 the evaluation element 516 determines the amount of errors detected in the outbound preamble 406. It will be appreciated that other portions of the message can also be used for error detection. In step 816 if the quality test of the evaluation element 516 fails then in step 818 the reversion control element 534 checks for pre-stored values in the adjustment control signal values element 326 in the EEPROM 321. If prestored values are not available in the adjustment control signals values element 326 then in step 822 the defaulter control element 536 reads prestored values in the default adjustment control signal values element 328 in the EEPROM 321. If, however, the reversion control element 534 determines pre-stored are available in the adjustment control signals values element 326 then in step 820 the reversion control element 534 reads the values in the adjustment control signals values element 326. Invocation of either the reversion control element 534 or the defaulter control element 536 leads to step 828 to be discussed below. If the evaluation element 516 passes the quality test in step 816 then in step 824 the derivation element 518 derives estimates from the N frequency deviation levels using mean values calculated by the calculation element 514 or other comparable methods. In step 826 the estimates are stored in the EEPROM 321. In step 828 the acknowledge-back transmission element 315 processes the acknowledge-back message. In step 830 the acknowledge-back message is transmitted by the transmitter portion 602 in a second modulation format with M deviation levels. In step 832 the receiver portion 601 receives and demodulates the second modulated signal and the sampler element 520 samples the inbound preamble 414.

Figure 9:
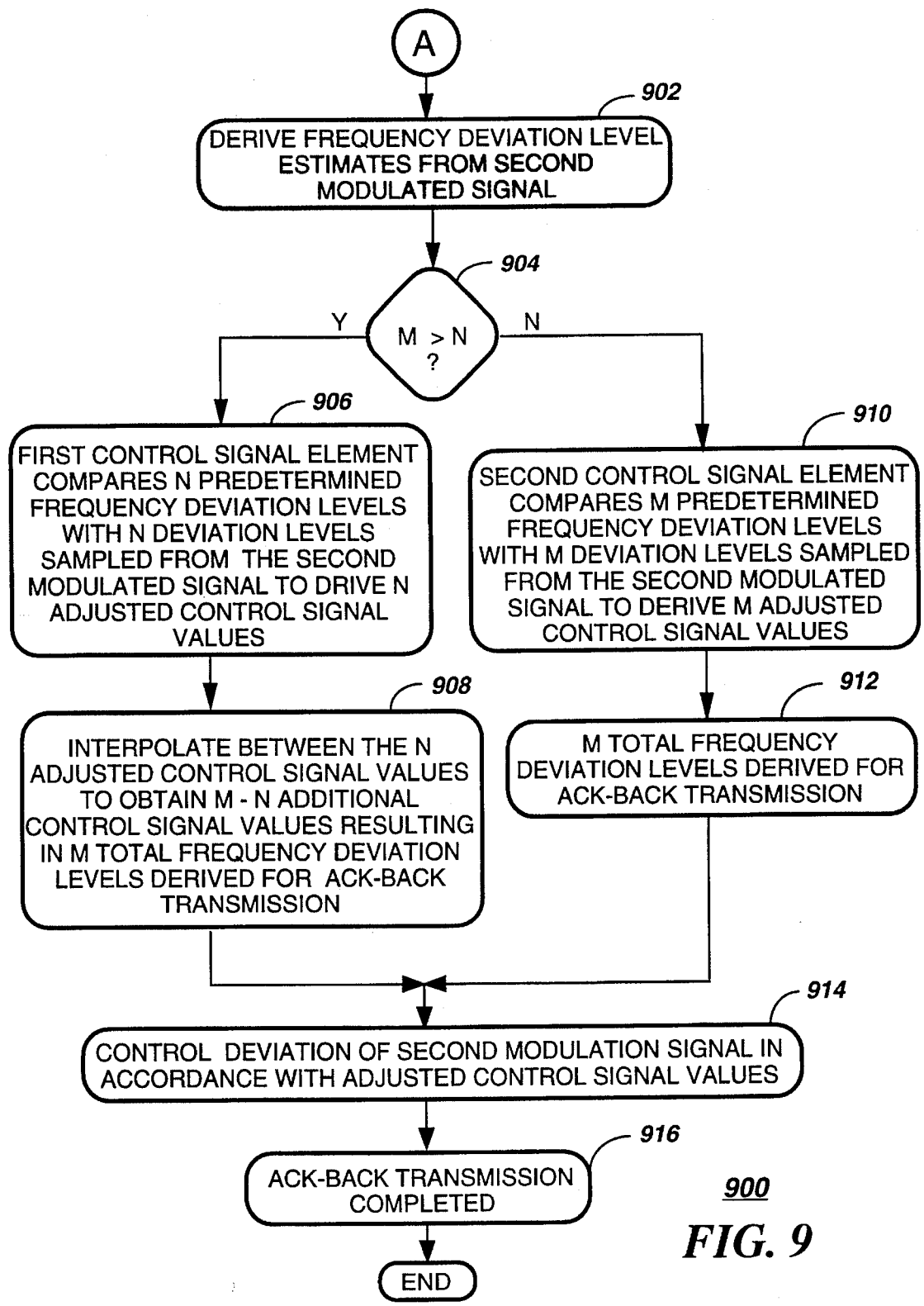
FIG. 9 is a flow chart (continuation of FIG. 8) depicting operation of the portable transceiver in accordance with the preferred and alternative embodiments of the present invention.

Referring to FIG. 9, a continuation flow chart 900 of FIG. 8 summarizing the operation of the portable transceiver in accordance with the preferred and alternative embodiments of the present invention begins with step 902 where the derivation element 518 derives frequency deviation level estimates from the second modulated signal. In step 904 if the M frequency deviation levels is greater than the N predetermined frequency deviation levels sent by the base stations 116, step 906 is invoked; otherwise step 910 is invoked by the processor 308. In step 906 the first control signal element compares the N predetermined frequency deviation levels with N corresponding deviation levels sampled from the second modulated signal to derive N adjusted control signal values. In step 908 the interpolation element 528 interpolates between the N adjusted control signal values to obtain M-N additional control signal values resulting in M total frequency deviation levels derived for acknowledge-back transmission. Step 910, in accordance with an alternative embodiment of the present invention, handles the case when M is equal to or less than N. In step 910 the second control signal element 530 compares M predetermined frequency deviation levels with M corresponding deviation levels sampled from the second modulated signal. In step 912 all M adjusted control signal values are derived directly for acknowledge-back transmission without interpolation. Both step 908 and step 912 merge with step 914. In step 914 the deviation control element 532 adjusts the transmitter portion 602 in accordance with the adjusted control signal values determined in the above steps. In step 916 acknowledge-back transmission is completed.

Thus, it should be apparent by now that the present invention provides a method and apparatus for controlling frequency deviation levels of a portable transceiver 122 in a cost effective manner without sacrificing accuracy for reliable inbound communication with the base stations 116.

What is claimed is:

1. A method of controlling a plurality of frequency deviation levels of a portable transceiver that utilizes a time-division-duplex (TDD) protocol for communicating with a base transceiver, the method comprising in the base transceiver the step of:

transmitting a first modulated signal having a first plurality of frequency deviation levels during a base-to-portable time slot of the TDD protocol; and the method further comprising in the portable transceiver the steps of:

receiving the first modulated signal to produce a first received signal;

measuring the first received signal to derive estimates of the first plurality of frequency deviation levels, in response to the first received signal passing a predetermined quality test;

storing the estimates of the first plurality of frequency deviation levels in a memory;

thereafter generating a second modulated signal having a second plurality of frequency deviation levels controlled by a plurality of control signal values during a portable-to-base time slot of the TDD protocol;

sampling the second modulated signal to derive a second received signal;

appraising the second received signal to derive estimates of the second plurality of frequency deviation levels;

comparing corresponding estimates of the first and second pluralities of frequency deviation levels to derive a plurality of adjusted control signal values for controlling the second plurality of frequency deviation levels to approximate the first plurality of frequency deviation levels; and thereafter controlling the second plurality of frequency deviation levels in accordance with the plurality of adjusted control signal values.

2. The method of claim 1, wherein the transmitting step comprises the step of sending a predetermined signal having a predetermined plurality of frequency deviation levels.

3. The method of claim 1, wherein the transmitting step comprises the step of transmitting a predetermined signal having N predetermined frequency deviation levels, N being a predetermined integer, and wherein the second modulated signal has M frequency deviation levels, M being a predetermined integer greater than N, and wherein the comparing step comprises the steps of:

comparing the N predetermined frequency deviation levels with N corresponding frequency deviation levels of the second modulated signal to derive N adjusted control signal values for controlling the N corresponding frequency deviation levels of the second modulated signal to approximate the N predetermined frequency deviation levels; and interpolating between the N adjusted control signal values to obtain M-N additional adjusted control signal values corresponding to M-N additional frequency deviation levels of the second modulated signal.

4. The method of claim 1, wherein the second modulated signal has M frequency deviation levels, M being a predetermined integer, and wherein the transmitting step comprises the step of transmitting a predetermined signal having N predetermined frequency deviation levels, M of which correspond to the M frequency deviation levels of the second modulated signal, N being a predetermined integer equal to or greater than M, and wherein the comparing step comprises the steps of:

comparing the M corresponding predetermined frequency deviation levels with the M frequency deviation levels of the second modulated signal to derive M adjusted control signal values for controlling the M frequency deviation levels of the second modulated signal to approximate the M corresponding predetermined frequency deviation levels.

5. The method of claim 1, wherein the transmitting step: comprises the step of transmitting a predetermined signal having N predetermined frequency deviation levels, N being a predetermined integer, and wherein ones of the N predetermined frequency deviation levels are transmitted a plurality of times in the predetermined signal, and wherein the measuring step comprises the steps of:
measuring the ones of the N predetermined frequency deviation levels as they are transmitted, to derive a plurality of instantaneous deviation values; and
calculating for the predetermined signal a plurality of mean values from the plurality of instantaneous deviation values corresponding to the ones of the N predetermined frequency deviation levels to derive the estimates of the first plurality of frequency deviation levels.

6. The method of claim 1, wherein the measuring step comprises the steps of:
evaluating the first received signal to produce an error count of errors received in the first received signal, for the predetermined quality test; and
deriving the estimates of the first plurality of frequency deviation levels from the first received signal, in response to the error count being less than a predetermined number, and wherein the method further comprises the steps of:
controlling the second plurality of frequency deviation levels in accordance with earlier adjusted control signal values calculated and stored from an earlier received first modulated signal, in response to the error count being equal to or greater than the predetermined number, and the earlier adjusted control signal values being available; and
controlling the second plurality of frequency deviation levels in accordance with default control signal values, in response to the error count being equal to or greater than the predetermined number, and the earlier adjusted control signal values not being available.

7. A system for controlling a plurality of frequency deviation levels of a portable transceiver that utilizes a time-division-duplex (TDD) protocol for communicating, the system comprising:

controller and base transceiver means for transmitting a first modulated signal having a first plurality of frequency deviation levels during a base-to-portable time slot of the TDD protocol; and the portable transceiver, comprising:

processor means for controlling the portable transceiver;

receiver means coupled to the processor means for receiving the first modulated signal to produce a first received signal;

measurement means coupled to the processor means for measuring the first received signal to derive estimates of the first plurality of frequency deviation levels, in response to the first received signal passing a predetermined quality test;

memory means coupled to the processor means for storing the estimates of the first plurality of frequency deviation levels;

transmitter means coupled to the processor means for generating a second modulated signal having a second plurality of frequency deviation levels controlled by a plurality of control signal values during a portable-to-base time slot of the TDD protocol;

sampler means coupled to the processor means for sampling the second modulated signal to derive a second received signal;

appraiser means coupled to the processor means for appraising the second received signal to derive estimates of the second plurality of frequency deviation levels;

comparator means coupled to the processor means for comparing corresponding estimates of the first and second pluralities of frequency deviation levels to derive a plurality of adjusted control signal values for controlling the second plurality of frequency deviation levels to approximate the first plurality of frequency deviation levels; and deviation control means coupled to the processor means for controlling the second plurality of frequency deviation levels in accordance with the plurality of adjusted control signal values.

8. The system of claim 7, wherein the controller and base transceiver means comprises a first sender means for sending a predetermined signal having a predetermined plurality of frequency deviation levels.

9. The system of claim 7, wherein the controller and base transceiver means comprises a second sender means for transmitting a predetermined signal having N predetermined frequency deviation levels, N being a predetermined integer, and wherein the second modulated signal has M frequency deviation levels, M being a predetermined integer greater than N, and wherein the comparator means comprises:
first control signal means coupled to the processor means for comparing the N predetermined frequency deviation levels with N corresponding frequency deviation levels of the second modulated signal to derive N adjusted control signal values for controlling the N corresponding frequency deviation levels of the second modulated signal to approximate the N predetermined frequency deviation levels; and
interpolation means coupled to the processor means for interpolating between the N adjusted control signal values to obtain M-N additional adjusted control signal values corresponding to M-N additional frequency deviation levels of the second modulated signal.

10. The system of claim 7, wherein the second modulated signal has M frequency deviation levels, M being a predetermined integer, and wherein the controller and base transceiver means comprises a third sender means for transmitting a predetermined signal having N predetermined frequency deviation levels, M of which correspond to the M frequency deviation levels of the second modulated signal, N being a predetermined integer equal to or greater than M, and wherein the comparator means comprises:

second control signal means coupled to the processor means for comparing the M corresponding predetermined frequency deviation levels with the M frequency deviation levels of the second modulated signal to derive M adjusted control signal values for controlling the M frequency deviation levels of the second modulated signal to approximate the M corresponding predetermined frequency deviation levels.

11. The system of claim 7,
wherein the controller and base transceiver means comprises a fourth sender means for transmitting a predetermined signal having N predetermined frequency deviation levels, N being a predetermined integer, and
wherein ones of the N predetermined frequency deviation levels are transmitted a plurality of times in the predetermined signal, and
wherein the measurement means comprises:
  instantaneous determination means coupled to the processor means for measuring the ones of the N predetermined frequency deviation levels as they are transmitted, to derive a plurality of instantaneous deviation values; and
  calculation means coupled to the instantaneous determination means for calculating for the predetermined signal a plurality of mean values from the plurality of instantaneous deviation values corresponding to the ones of the N predetermined frequency deviation levels to derive the estimates of the first plurality of frequency deviation levels.

12. The system of claim 7,
wherein the measurement means comprises:
  evaluation means coupled to the processor means for evaluating the first received signal to produce an error count of errors received in the first received signal, for the predetermined quality test; and
  derivation means coupled to the processor means for deriving the estimates of the first plurality of frequency deviation levels from the first received signal, in response to the error count being less than a predetermined number, and
wherein the portable transceiver further comprises:
  reversion control means coupled to the processor means for controlling the second plurality of frequency deviation levels in accordance with earlier adjusted control signal values calculated and stored from an earlier received first modulated signal, in response to the error count being equal to or greater than the predetermined number, and the earlier adjusted control signal values being available; and
  defaulter control means coupled to the processor means for controlling the second plurality of frequency deviation levels in accordance with default control signal values, in response to the error count being equal to or greater than the predetermined number, and the earlier adjusted control signal values not being available.

13. A portable transceiver for controlling a plurality of frequency deviation levels generated by the portable transceiver for use in a system that utilizes a time-division-duplex (TDD) protocol for communicating, the system having a controller and a base transceiver for transmitting a first modulated signal having a first plurality of frequency deviation levels during a base-to-portable time slot of the TDD protocol, the portable transceiver comprising:
  a processor for controlling the portable transceiver;
  a receiver coupled to the processor for receiving the first modulated signal to produce a first received signal;
  a measurement element coupled to the processor for measuring the first received signal to derive estimates of the first plurality of frequency deviation levels, in response to the first received signal passing a predetermined quality test;
  a memory coupled to the processor for storing the estimates of the first plurality of frequency deviation levels;
  a transmitter coupled to the processor for generating a second modulated signal having a second plurality of frequency deviation levels controlled by a plurality of control signal values during a portable-to-base time slot of the TDD protocol;
  a sampler element coupled to the processor for sampling the second modulated signal to derive a second received signal;
  an appraiser element coupled to the processor for appraising the second received signal to derive estimates of the second plurality of frequency deviation levels;
  a comparator element coupled to the processor for comparing corresponding estimates of the first and second pluralities of frequency deviation levels to derive a plurality of adjusted control signal values for controlling the second plurality of frequency deviation levels to approximate the first plurality of frequency deviation levels; and
  a deviation control element coupled to the processor for controlling the second plurality of frequency deviation levels in accordance with the plurality of adjusted control signal values.

14. The portable transceiver of claim 13, wherein the controller and the base transceiver transmit a predetermined signal having N predetermined frequency deviation levels, N being a predetermined integer, and wherein the second modulated signal has M frequency deviation levels, M being a predetermined integer greater than N, and wherein the comparator element comprises:
  a first control signal element coupled to the processor for comparing the N predetermined frequency deviation levels with N corresponding frequency deviation levels of the second modulated signal to derive N adjusted control signal values for controlling the N corresponding frequency deviation levels of the second modulated signal to approximate the N predetermined frequency deviation levels; and
  an interpolation element coupled to the processor for interpolating between the N adjusted control signal values to obtain M-N additional adjusted control signal values corresponding to M-N additional frequency deviation levels of the second modulated signal.

15. The portable transceiver of claim 13, wherein the second modulated signal has M frequency deviation levels, M being a predetermined integer, and wherein the controller and the base transceiver transmit a predetermined signal having N predetermined frequency deviation levels, M of which correspond to the M frequency deviation levels of the second modulated signal, N being a predetermined integer equal to or greater than M, and wherein the comparator element comprises:
  a second control signal element coupled to the processor for comparing the M corresponding predetermined frequency deviation levels with the M frequency deviation levels of the second modulated signal to derive M adjusted control signal values for controlling the M frequency deviation levels of the second modulated signal to approximate the M corresponding predetermined frequency deviation levels.

16. The portable transceiver of claim 13, wherein the controller and the base transceiver transmit a predetermined signal having N predetermined frequency deviation levels, N being a predetermined integer, and wherein ones of the N predetermined frequency deviation levels are transmitted a plurality of times in the predetermined signal, and wherein the measurement element comprises:

an instantaneous determination element coupled to the processor for measuring the ones of the N predetermined frequency deviation levels as they are transmitted, to derive a plurality of instantaneous deviation values; and a calculation element coupled to the instantaneous determination element for calculating for the predetermined signal a plurality of mean values from the plurality of instantaneous deviation values corresponding to the ones of the N predetermined frequency deviation levels to derive the estimates of the first plurality of frequency deviation levels.

17. The portable transceiver of claim 13, wherein the measurement element comprises:

an evaluation element coupled to the processor for evaluating the first received signal to produce an error count of errors received in the first received signal, for the predetermined quality test; and a derivation element coupled to the processor for deriving the estimates of the first plurality of frequency deviation levels from the first received signal, in response to the error count being less than a predetermined number, and wherein the portable transceiver further comprises:

a reversion control element coupled to the processor for controlling the second plurality of frequency deviation levels in accordance with earlier adjusted control signal values calculated and stored from an earlier received first modulated signal, in response to the error count being equal to or greater than the predetermined number, and the earlier adjusted control signal values being available; and a defaulter control element coupled to the processor for controlling the second plurality of frequency deviation levels in accordance with default control signal values, in response to the error count being equal to or greater than the predetermined number, and the earlier adjusted control signal values not being available.

* * * * *